United States Patent
Decker

(10) Patent No.: US 8,148,935 B2
(45) Date of Patent: Apr. 3, 2012

(54) MACHINE WITH FLYWHEEL-LESS BUFFER DRIVE

(75) Inventor: Jürgen Decker, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 384 days.

(21) Appl. No.: 12/560,799

(22) Filed: Sep. 16, 2009

(65) Prior Publication Data

US 2010/0066297 A1 Mar. 18, 2010

(30) Foreign Application Priority Data

Sep. 18, 2008 (EP) .................................. 08016487

(51) Int. Cl.
*H02P 27/04* (2006.01)

(52) U.S. Cl. ........ 318/800; 318/150; 318/161; 318/801; 74/572.1

(58) Field of Classification Search .................. 318/150, 318/161, 800, 801; 74/142, 731.1, 433.5, 74/490.03, 572.1, 572.2; 72/421, 452.5, 72/453.11, 443; 100/48

See application file for complete search history.

(56) References Cited

U.S. PATENT DOCUMENTS

| | | | | |
|---|---|---|---|---|
| 5,588,344 | A * | 12/1996 | Chun ................................. | 83/13 |
| 5,646,458 | A * | 7/1997 | Bowyer et al. ................... | 307/67 |
| 7,637,139 | B2 * | 12/2009 | Naito et al. ................... | 72/452.5 |
| 7,805,973 | B2 * | 10/2010 | Bosga et al. ................. | 72/452.5 |

* cited by examiner

*Primary Examiner* — Walter Benson
*Assistant Examiner* — Antony M Paul
(74) *Attorney, Agent, or Firm* — Henry M. Feiereisen; Ursula B. Day

(57) ABSTRACT

A machine has a basic body and a machine element. The machine element can be moved relative to the basic body by an electric working drive which is connected to an electric supply system via a working converter. An electric buffer drive is connected to the electric supply system via a buffer converter. The working converter and the buffer converter are controlled by a control device in line with a predetermined travel movement of the machine element in a coordinated manner. The coordination is such that a total load on the supply system by both converters together during the total travel movement of the machine element remains below a maximum load prompted by the working converter alone. The buffer drive has a drive shaft which has no flywheel connected to it.

3 Claims, 2 Drawing Sheets

MACHINE WITH FLYWHEEL-LESS BUFFER DRIVE

CROSS-REFERENCES TO RELATED APPLICATIONS

This application claims the priority of European Patent Application, Serial No. EP 08016487, filed Sep. 18, 2008, pursuant to 35 U.S.C. 119(a)-(d), the content of which is incorporated herein by reference in its entirety as if fully set forth herein.

BACKGROUND OF THE INVENTION

The present invention relates, in general, to a machine having a basic body and a machine element which is movable relative to the basic body by an electric working drive.

The following discussion of related art is provided to assist the reader in understanding the advantages of the invention, and is not to be construed as an admission that this related art is prior art to this invention.

Movable machine elements in machines are normally driven by means of electric motors (electric working drives). In many cases, the electric motors need to perform highly dynamic movements for this. During acceleration and braking of the movement, large current spikes occur. Normally, the current spikes are taken directly from the supply system supplying power to the respective drive and are returned to the system by generator. This practice causes high load levels on the supply system. In addition, the high peak current requirement means that the electric infrastructure, such as supply lines, fuses, contactors, transformers, etc., needs to be appropriately dimensioned, so that it can cope with the peak current requirement.

Machines with a high peak current demand normally do not require special measures to be taken in order to lower the current spikes on the supply system. In individual cases, however, it is known to additionally provide a further electric drive (electric buffer drive) which has a flywheel connected to it. The presence of the flywheel means necessitate considerable safety precautions. In particular, it is necessary to ensure that a dangerous state does not occur even if the flywheel detaches from the buffer drive. In addition, the flywheel needs to be counterbalanced with a high level of accuracy. Otherwise, there will very quickly be bearing wear in the buffer drive.

It would therefore be desirable and advantageous to provide an improved machine which obviates prior art shortcomings and which is simple in structure and yet reliable in operation.

SUMMARY OF THE INVENTION

According to one aspect of the present invention, a machine includes a basic body, a machine element, an electric working drive for movement of the machine element relative to the basic body; an electric supply system; a working converter connecting the electric working drive to the electric supply system; an electric buffer drive having a drive shaft in the absence of a flywheel connected to the drive shaft; a buffer converter connecting the electric buffer drive to the electric supply system, and a control device controlling the working converter and the buffer converter in line with a predetermined travel movement of the machine element with such coordination that a total load on the supply system by the working and buffer converters together during a total travel movement of the machine element remains below a maximum load prompted by the working converter alone.

An essential feature of the present invention is the absence of a flywheel that is connected to the drive shaft of the buffer drive to have no flywheel connected to it.

According to another advantageous feature of the present invention, the working converter and the buffer converter may be implemented in the form of direct converters, and the electric supply system may correspondingly be configured in the form of an AC voltage system. The AC voltage system can be designed in the form of a three-phase system. As an alternative, the electric supply system may be implemented in the form of a DC voltage circuit for an electric intermediate circuit converter. The working converter and the buffer converter may then be configured in the form of inverters. The DC voltage circuit can be connected to an AC voltage system via a controlled rectifier. The rectifier can be controlled by the control device in line with the total load on the supply system, i.e. the DC voltage circuit.

Although, it is possible for the DC voltage circuit to have further converters connected to it, for example in order to supply electric power to further drives, according to another advantageous feature of the present invention, the DC voltage circuit is realized in the absence of further converters connected to it with the exception of the rectifier, the working converter and the buffer converter.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
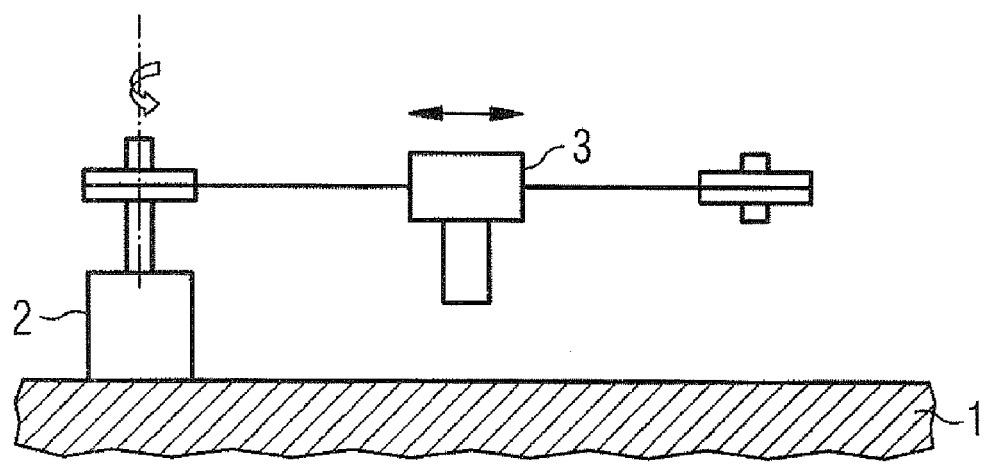
FIG. 1 is a schematic illustration of a machine.

Throughout all the Figures, same or corresponding elements may generally be indicated by same reference numerals. These depicted embodiments are to be understood as illustrative of the invention and not as limiting in any way. It should also be understood that the Figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an electric machine having a basic body 1. The machine also has an electric drive 2, which is subsequently referred to as working drive 2. The working drive 2 can be used to move a machine element 3 of the machine relative to the basic body 1.

As shown by the illustration in FIG. 1, the working drive 2 is a rotary electric drive. This illustration is purely exemplary, however. Alternatively, it could be a linear drive. In addition, FIG. 1 shows that the machine element 3 is moved linearly relative to the basic body 1 by means of the working drive 2. This illustration is also purely exemplary, however. Within the context of the present invention, the only significance is that the machine element 3 can be moved by means of the electric working drive 2.

Figure 2:
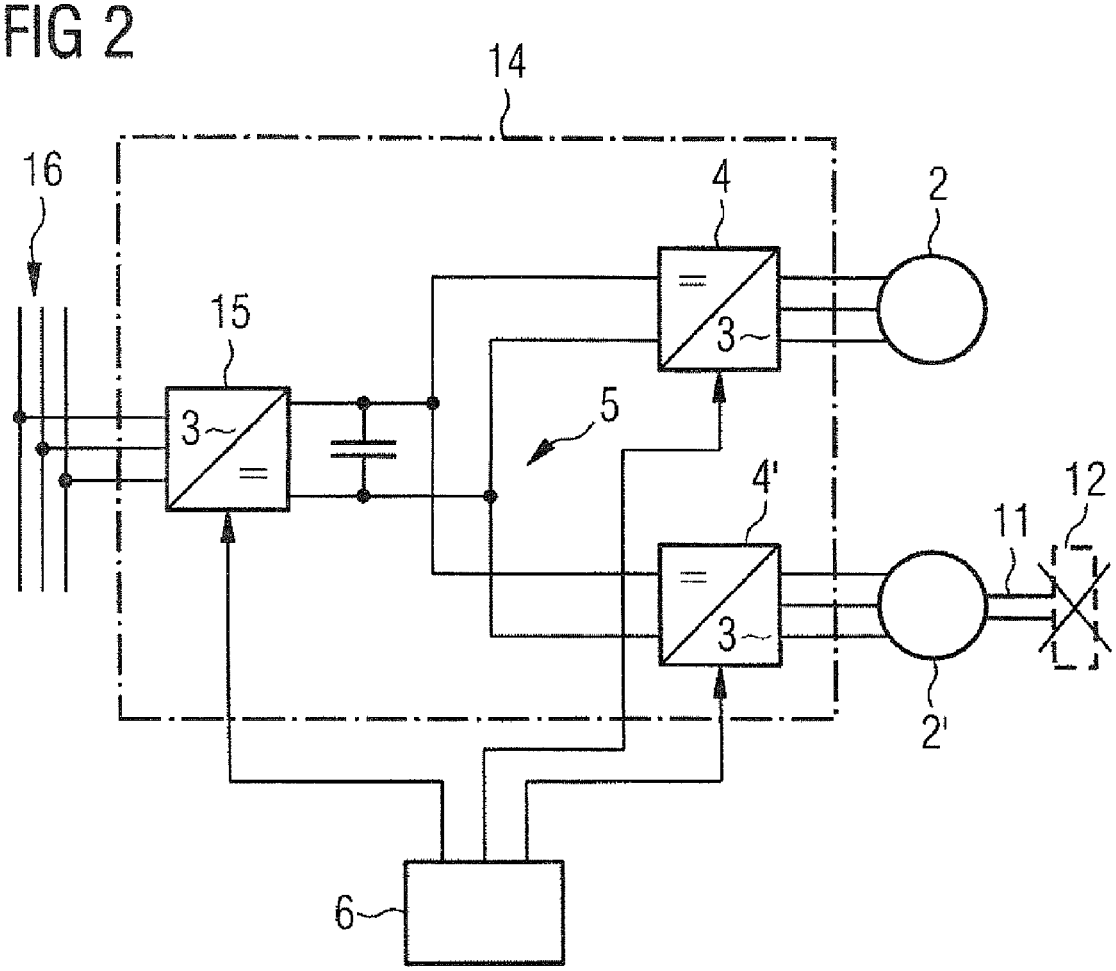
FIG. 2 is a block diagram of an electric supply circuit.
Figure 3:
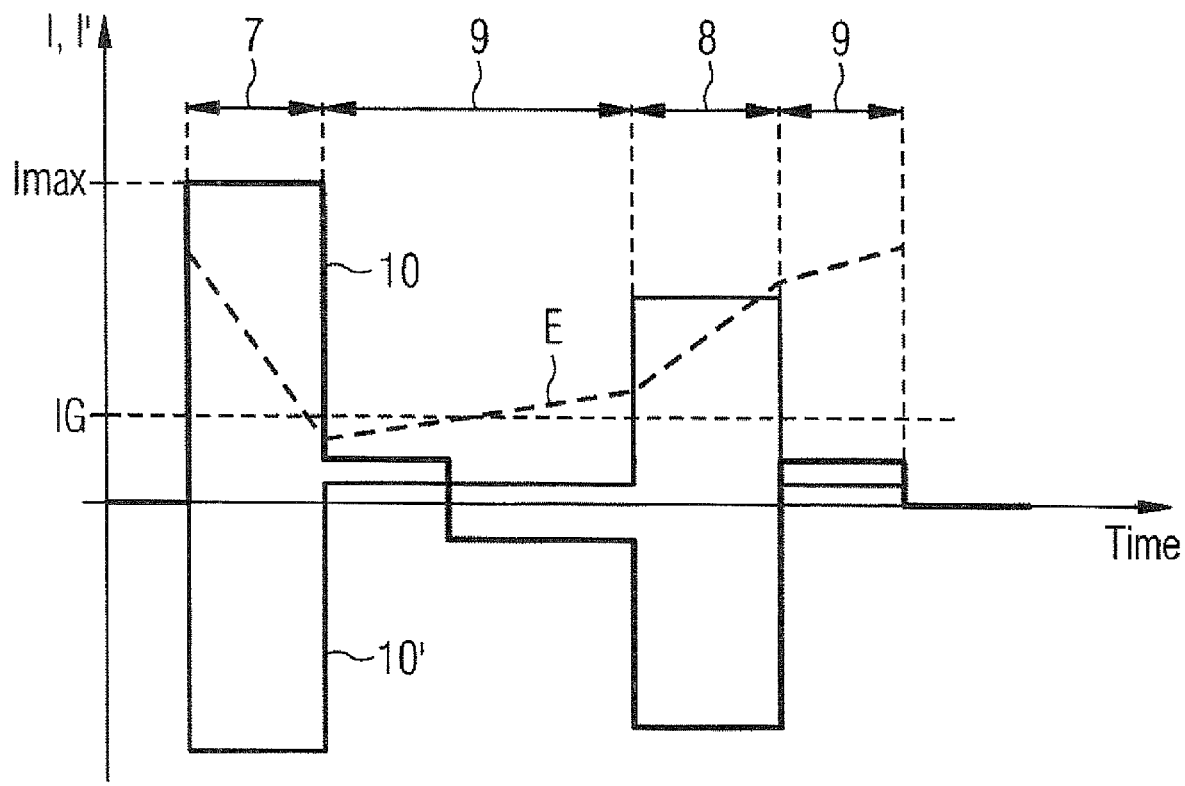
FIG. 3 is a timing diagram showing the relationship between current as a function of time.

As FIG. 2 shows, the electric working drive 2 is connected to an electric supply system 5 by means of a converter 4—subsequently referred to as working converter 4. The working converter 4 is controlled by a control device 6. The working converter 4 is controlled in line with a predetermined travel movement of the machine element 3. Within the context of the predetermined travel movement of the machine element 3, FIG. 3 shows that there exists at least one first phase 7, at least one second phase 8 and—at least usually—at least one third phase 9. In the first phase 7, the working converter 4 takes a large current I from the supply system 5. In the second phase 8, the working converter 4 returns current I to the supply system 5. In the third phase 9, the current I is between the values of the first phase 7 and the second phase 8. Actuation of the working converter 4 taken on its own therefore prompts a single load 10 on the supply system 5, said load having a maximum value Imax. The maximum value Imax is determined by that value of the current I which has the largest magnitude.

As FIG. 2 shows, a further drive 2' is likewise connected to the electric supply system 5 via a further converter 4'. The further drive 2' is subsequently referred to as buffer drive 2' in order to linguistically distinguish it from working drive 2. Similarly, the further converter 4' is subsequently referred to as buffer converter 4' in order to linguistically distinguish it from working converter 4.

The buffer converter 4' is also controlled by the control device 6. The control of the buffer converter 4' is coordinated to the control of the working converter 4. The coordination is such that—in simple terms—the buffer converter 4' is actuated inversely with respect to the working converter 4. As shown by the illustration in FIG. 3, the buffer converter 4' supplies a relatively large current I' to the electric supply system 5 in the first phase 7. In addition, the buffer converter 4' takes a relatively large current I' from the supply system 5 in the second phase 8. If required, the current I' in the buffer converter 4' is also adjusted in the third phase 9 as needed.

As a result, the effect achieved by the coordinated actuation of the working converter 4 and the buffer converter 4' is that a total load IG on the electric supply system 5 by both converters 4, 4' together during the total travel movement of the machine element 3 remains below the maximum load Imax which is prompted by the working converter 4 alone.

Figure 4:
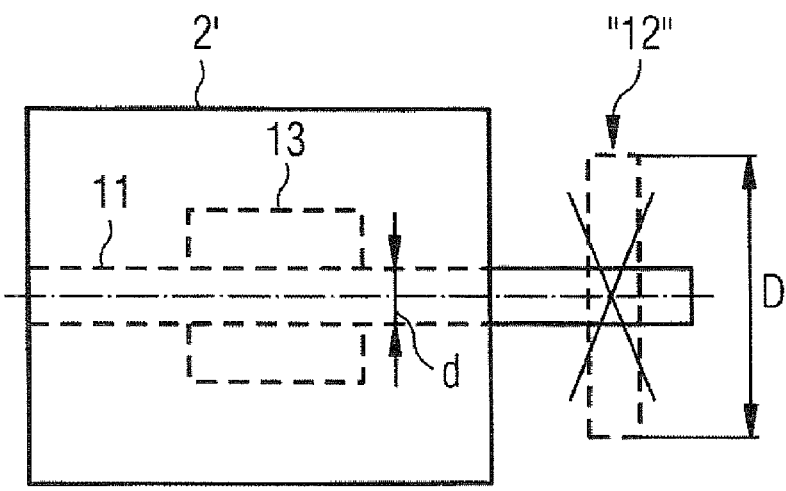
FIG. 4 is a schematic illustration of a buffer drive.

In principle, the relevant design of the machine and the manner of operation of the machine are known in the prior art. In the prior art, however, FIGS. 2 and 4 show that a flywheel 12 is connected to a drive shaft 11 of the buffer drive 2'. The flywheel 12 in the prior art is thus detachably coupled to the drive shaft 11 of the buffer drive 2'. In the prior art, the flywheel 12 has an external diameter D which is substantially larger than a maximum diameter D of the drive shaft 11. For clarification purposes, it should be pointed out that the term "drive shaft 11" denotes that element of the buffer drive 2' on which the laminated rotor core 13 of the buffer drive 4' is mounted.

In contrast to the practice in the prior art, the present invention has no flywheel 12 connected to the drive shaft 11 of the buffer drive 2'. There is therefore just the "bare" drive shaft 11. This is indicated in FIGS. 2 and 4 by virtue of the fact that, although the flywheel 12 is shown, it is shown only in dashes and is furthermore crossed out.

In contrast to the prior art, the present invention therefore merely involves the use of an electric drive 4' as it is ("off the shelf") for buffer-storing energy. It is merely necessary to note that the inherent inertia of the buffer drive 2' and the possible rotation speed of the buffer drive 2' are chosen in suitable fashion.

It is possible for the converters 4, 4' to be in the form of direct converters. The electric supply system 5 is in this case in the form of an AC voltage system. Usually—see FIG. 2—the electric supply system 5 is in the form of a DC voltage circuit for an electric intermediate circuit converter 14, however. To correspond to this, the working converter 4 and the buffer converter 4' are in the form of inverters. The DC voltage circuit 5 of the intermediate circuit converter 14 is connected to an AC voltage system 16 (usually a three-phase system) via a controlled rectifier 15. In this refinement, that is to say when the intermediate circuit converter 14 and the controlled rectifier 15 are present, the rectifier 15 is also controlled by the control device 6. The rectifier 15 is actuated in line with the total load IG on the supply system 5.

During acceleration and during setup of a reaction torque in the working drive 2, the working drive 2 draws electric power from the DC voltage circuit 5 via the working converter 4. During this time period (essentially corresponds to the first phase 7), the buffer drive 2' is operated as a generator which supplies the current I' it produces to the DC voltage circuit 5. This reduces a kinetic energy content E (see FIG. 3) stored by the buffer drive 2'. Conversely, when the working drive 2 is being slowed down (essentially corresponds to the second phase 8), the buffer drive 2' is accelerated, which means that its kinetic energy content E increases again. In the remaining time (essentially corresponds to the third phase 9), the kinetic energy content E of the buffer drive 2' is adjusted as required.

It is possible to connect further converters to the DC voltage circuit 5, said converters being able to be used to supply power to further drives. The more converters there are connected to the DC voltage circuit 5, the more complex is the control by the control device 6, however. Usually, the DC voltage circuit 5 therefore has only the rectifier 15, the working converter 4 and the buffer converter 4' connected to it, as shown by FIG. 2. Further converters are not connected to the DC voltage circuit 5.

The present invention has many advantages. Thus, in contrast to the prior art, no flywheel 12 is required. In addition, no special bearings for the buffer drive 2' and the flywheel 12 are required. Safety measures for the instance of inadvertent detachment of the flywheel 12 from the buffer drive 2' are also not required. The result is a compact design.

The present invention can be applied to the widest variety of machines. Examples of suitable machines are servo presses, spindle presses, shears, crosscutters, pipe and sheet bending machines, motor test benches, etc. Feed drives or turntables, in which high peak currents or peak torques may arise, are also possible applications.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A machine, comprising:
   a basic body;

a machine element,
an electric working drive for movement of the machine element relative to the basic body;
an electric supply system;
a working converter connecting the electric working drive to the electric supply system;
an electric buffer drive having a drive shaft in the absence of a flywheel connected to the drive shaft;
a buffer converter connecting the electric buffer drive to the electric supply system, and
a control device controlling the working converter and the buffer converter in line with a predetermined travel movement of the machine element with such coordination that a total load on the supply system by the working and buffer converters together during a total travel movement of the machine element remains below a maximum load prompted by the working converter alone.

2. The machine of claim 1, wherein the supply system is constructed in the form of a DC voltage circuit for an electric intermediate circuit converter, wherein the working converter and the buffer converter are constructed in the form of inverters, wherein the DC voltage circuit is connected to an AC voltage system via a controlled rectifier, and wherein the rectifier is controlled by the control device in line with the total load on the supply system.

3. The machine of claim 2, wherein the DC voltage circuit has no further converters connected to it with the exception of the rectifier, the working converter) and the buffer converter.

* * * * *